United States Patent
Hammen et al.

(10) Patent No.: US 6,429,595 B1
(45) Date of Patent: Aug. 6, 2002

(54) MULTI-MODE TREATER WITH INTERNAL AIR COOLING SYSTEM

(75) Inventors: Richard R. Hammen, Menomonee Falls; Donald V. Rundberg, Germantown, both of WI (US)

(73) Assignee: Enercon Industries Corporation, Menomonee Falls, WI (US)

( * ) Notice: Subject to any disclaimer, the term of this patent is extended or adjusted under 35 U.S.C. 154(b) by 0 days.

(21) Appl. No.: 09/783,628

(22) Filed: Feb. 14, 2001

(51) Int. Cl.⁷ .................................................. H01J 7/24
(52) U.S. Cl. .............. 315/111.21; 315/110; 315/111.91; 422/186.05; 422/186.11; 422/186.07; 250/324; 250/326; 250/492.21
(58) Field of Search ............................ 315/111.21, 110, 315/111.91, 111.01; 422/186.05, 186.11, 186.07, 907; 250/324, 325, 326, 492.21

(56) References Cited

U.S. PATENT DOCUMENTS

| | | | |
|---|---|---|---|
| 3,409,537 A | 11/1968 | Cannon | 204/312 |
| 4,028,551 A * | 6/1977 | Thompson | 250/531 |
| 4,556,544 A | 12/1985 | Ahlbrandt | 422/186 |
| 4,575,329 A * | 3/1986 | Ahlbrandt | 425/174 |
| 5,281,174 A | 1/1994 | Bonner | 439/825 |
| 5,293,043 A | 3/1994 | Bonner | 250/324 |
| 5,437,844 A | 8/1995 | Bonner | 422/186 |
| 5,456,972 A | 10/1995 | Roth et al. | 428/224 |
| 5,789,145 A | 8/1998 | Glocker et al. | 430/527 |
| 6,106,659 A * | 8/2000 | Spence et al. | 156/345 |
| 6,118,218 A | 9/2000 | Yializis et al. | 315/111.21 |

* cited by examiner

Primary Examiner—Don Wong
Assistant Examiner—Tuyet T. Vo
(74) Attorney, Agent, or Firm—Quarles & Brady LLP

(57) ABSTRACT

A treater system includes a conductive roller electrode that supports a moving web that is to be treated. One or more active electrode assemblies mounted to support headers have a pair of active electrodes that are positioned to treat one surface of the web as the web passes over the roller electrode. Air or a gas/gas mixture can be selectively piped to a chamber adjacent the active electrodes and diffused along the length of the discharge surfaces to allow the treater to operate in three distinct modes: corona, chemical corona and atmospheric plasma. The active electrodes are cooled by passing air into and through tubular bodies of the active electrodes.

20 Claims, 4 Drawing Sheets

MULTI-MODE TREATER WITH INTERNAL AIR COOLING SYSTEM

CROSS REFERENCE TO RELATED APPLICATION

Not applicable.

STATEMENT OF FEDERALLY SPONSORED RESEARCH/DEVELOPMENT

Not applicable.

BACKGROUND OF THE INVENTION

The field of the invention is corona and plasma treater stations, and particularly, the cooling and selective operation of such stations.

Materials, such as paper, polymer webs and various films, are often used in printing, coating and laminating applications. Many polymers, for example, have chemically inert surfaces with low surface energies providing poor bonding properties. To improve bonding, the surface of the material must be treated to raise the surface tension and thereby improve the application of adhesives and inks. There are a number of known techniques for treating the surface of materials to raise surface energy including flame, chemical, corona and plasma treatments.

In corona treatment, the material is ordinarily fed through a treatment zone in which one surface of the material is bombarded with ions produced by a high voltage alternating electric field ordinarily operating at frequencies of 10–50 kHz. The material is supported in the treatment zone by a roller, which also serves as one electrode for the treater. An active electrode assembly is supported in the treatment zone and spaced from the roller equidistantly along its length. The active electrode may be either a single integral electrode that extends the entire width of the treater station, or it may be a set of electrode segments, which can be selectively moved into and out of a treatment position to adjust the location, and width of the treatment zone as disclosed in U.S. Pat. No. 3,409,537. In any event, a high voltage ac power supply is connected across the roller and active electrodes to produce a corona through which the web passes.

Plasma treaters provide a more uniform and controllable surface treatment that corona treaters. In plasma treaters, the treatment zone is infused with an inert gas that is partially ionized by the energized electrodes. Early plasma treaters required that the pressure of the ionized gas was reduced well below atmospheric pressure. This required expensive and cumbersome vacuum chambers and pumps to maintain the low pressure at the treatment zone.

Treaters forming plasma in the treatment zone at atmospheric pressure were subsequently developed, for example, as disclosed in U.S. Pat. No. 5,456,972. The plasma would form at atmospheric pressure provided an inert gas, typically helium, was used, a dielectric was applied between the electrodes and the operating frequency and voltage of power source was properly selected. Moreover, in the system of U.S. Pat. No. 5,789,145, the gas had to be forced through properly sized and spaced openings in the electrodes.

The art of atmospheric plasma treaters was again advanced by the system disclosed in U.S. Pat. No. 6,118,218 in which a gas or gas mixture was forcibly diffused through active electrodes made of a porous metal. This patent explains that as the gas passes through the small pores of the electrodes (on the order of a micron), a hollow cathode effect is produced which facilitates ionization of the gas so that a atmospheric plasma can be produced at low frequencies.

In all of these systems, a major design objective is to produce a certain treatment level with the minimum amount of input power. As a general matter, to achieve a higher treatment level with a given treater at atmospheric pressure, more electrical power is applied. Higher power levels produce more heat and methods must be used to dispose of this heat. Such methods include cooling the active electrode with external air, cooling the active electrode with cooling fluids, and the addition of active electrodes disposed around the circumference of the roller electrode to disperse the heat. All of these measures increase the complexity, size and cost of the treater; and it can introduce contaminants into the electrode assembly. Moreover, external air cooling is not suitable for plasma treaters because the plasma could be evacuated from the treatment zone.

SUMMARY OF THE INVENTION

One aspect of the present invention is a treater having an air cooling system for one or more tubular active electrodes with inlet and outlet ports in communication with an inner cavity of each active electrode. Air can be passed through the active electrodes from the inlet to the outlet ports to carry away thermal energy during use.

Another aspect of the invention is a treater that can be operated in any one of three distinct modes. The active electrodes form a chamber into which gas from one or more supply lines can be pumped. The gas in the chamber is spread along the discharge surfaces of the active electrodes by a diffuser made of a porous ceramic. Flow through the supply lines can be controlled to set the mode of use. In particular, the supply lines can be closed off so that only air is present in the treatment zone during the treatment process. In this case, the treater provides corona treatment. Alternatively, a gas or gas mixture including helium can be piped to the treatment zone, in which case the treater can provide atmospheric plasma treatment. Finally, the treater can operate in a "chemical corona" treatment mode in which the treatment zone is infused with a gas or gas mixture that is ionized but does not form a plasma.

One object of the invention is to provide a treater that can be operated in any one of three treatment modes: corona, chemical corona and atmospheric plasma. The treater of the invention can be operated in any one of the modes by simply controlling the flow of gas to the active electrodes and selecting the appropriate power parameters. Thus, the treatment level produced by the active electrode of a corona treater can be improved per unit of input energy by infusing the treatment zone with helium (or helium mixture) to create plasma at one atmosphere with considerably less power consumption.

Another object of the invention is to sufficiently cool the active electrodes without introducing contaminants into the assembly or using high volume exhaust system. This is accomplished by using hollow, impermeable active electrodes and transferring thermal energy using a low volume of compressed air circulating therethrough.

The foregoing and other advantages of the invention will appear from the following description. In that description reference is made to the accompanying drawings, which form a part hereof, and in which there is shown by way of illustration a preferred embodiment of the invention. This embodiment does not represent the full scope of the invention. Thus, the claims should be looked to in order to judge the full scope of the invention.

DESCRIPTION OF THE PREFERRED EMBODIMENT

Figure 1:
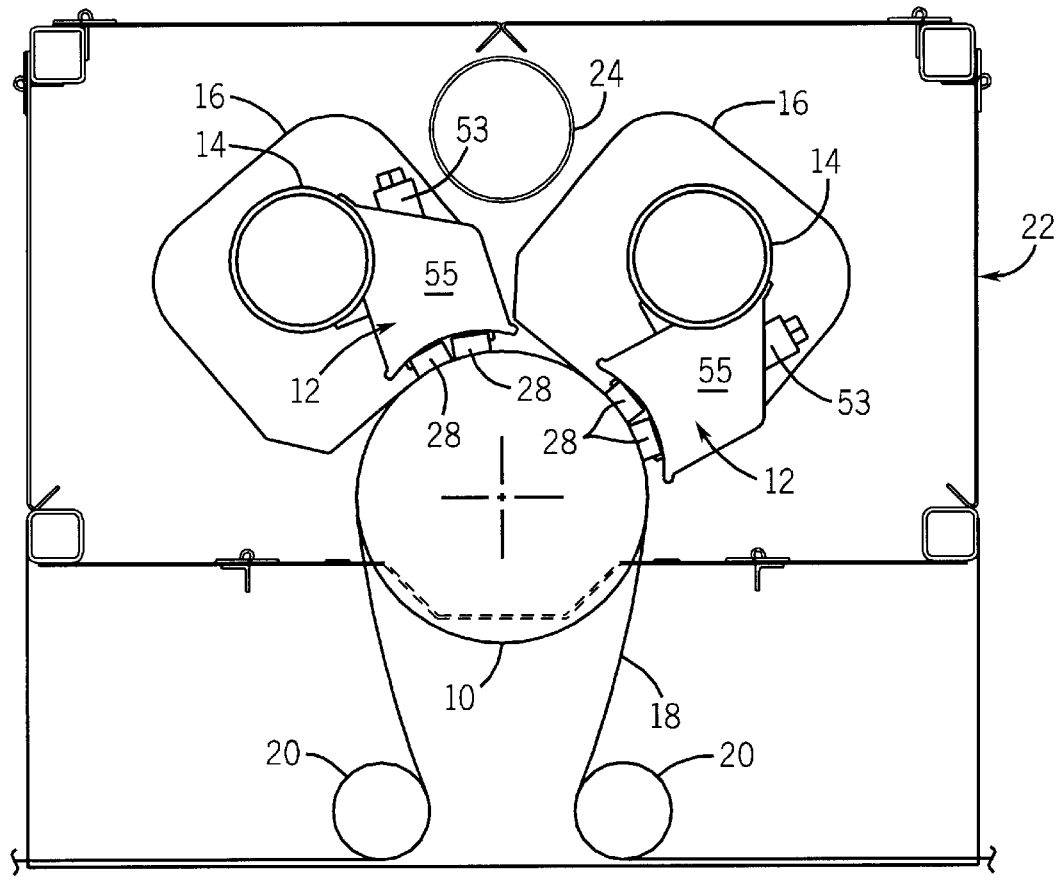
FIG. 1 is an end view of a two head treater system of the present invention.
Figure 2:
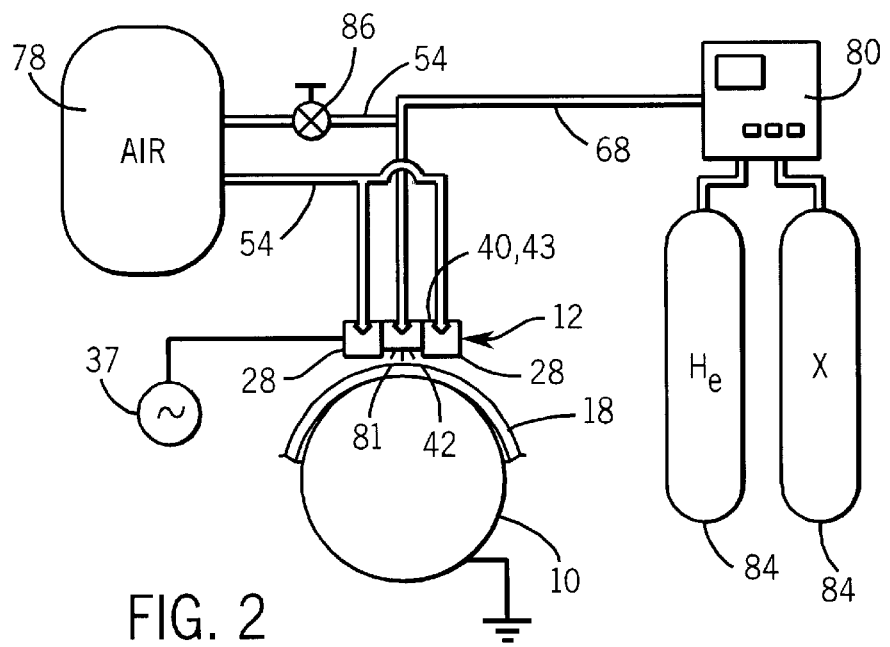
FIG. 2 is a diagrammatic view of a single head treater showing electrode connections and the connection of gas and air lines to the electrodes.

Referring particularly to FIG. 1, a multi-mode treater station includes a circular cylindrical roller electrode 10 and one or more active electrode assemblies 12 (shown in FIG. 2 with two). Each active electrode assembly 12 is mounted to a cylindrical header 14, preferably made of aluminum, and both the roller electrode 10 and header 14, are rotatably supported by a pair of spaced upright side assemblies 16 (one shown). A substrate in the form of a web 18 is fed into the treater past a pair of feed rollers 20 and around the roller electrode 10 causing it to rotate. The roller electrode 10 is a suitable metal, such as aluminum or steel, coated with a heat resistive dielectric material, such as ceramic. The working area of the treater is enclosed by a hood 22 formed of a number of metal tubular members and panels, preferably made of a suitable sheet metal, that can be hinged up to allow access to the active electrode assemblies 12 and roller electrode 10. An exhaust tube 24 extending from inside the hood 22 draws ozone produced by the ionization process into a chemical treatment chamber as known in the art.

Figure 3:
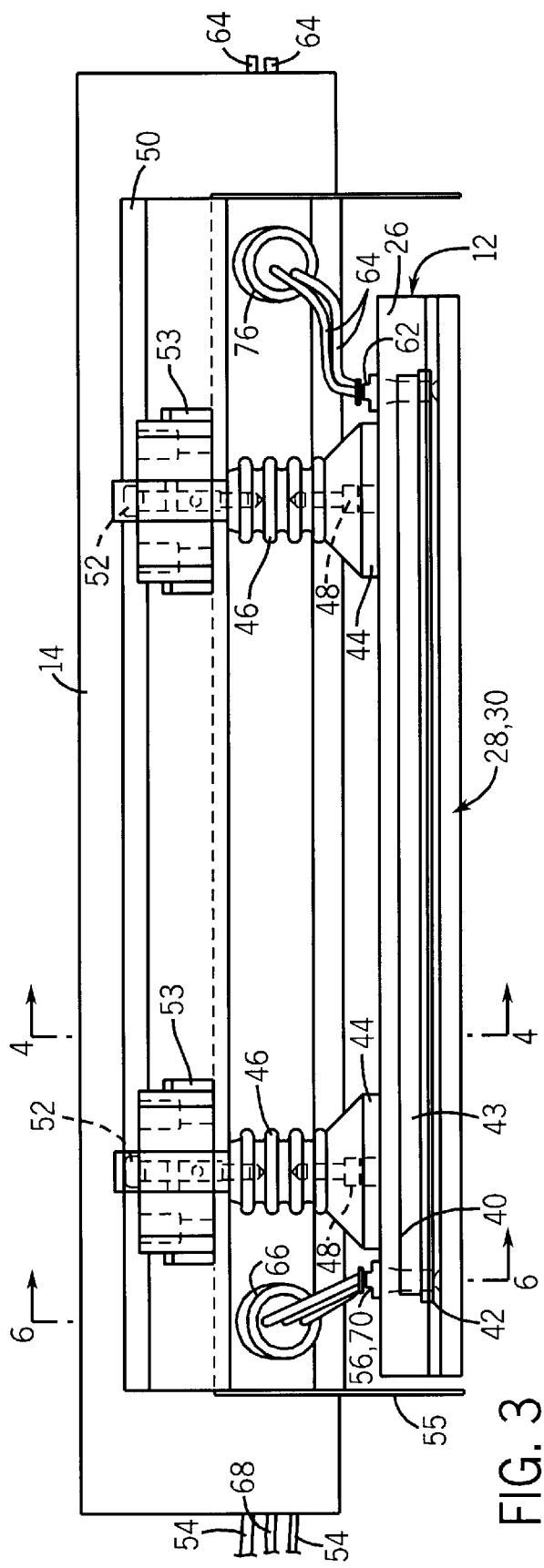
FIG. 3 is a partial front elevation view of an active electrode assembly mounted to a support header.
Figure 5:
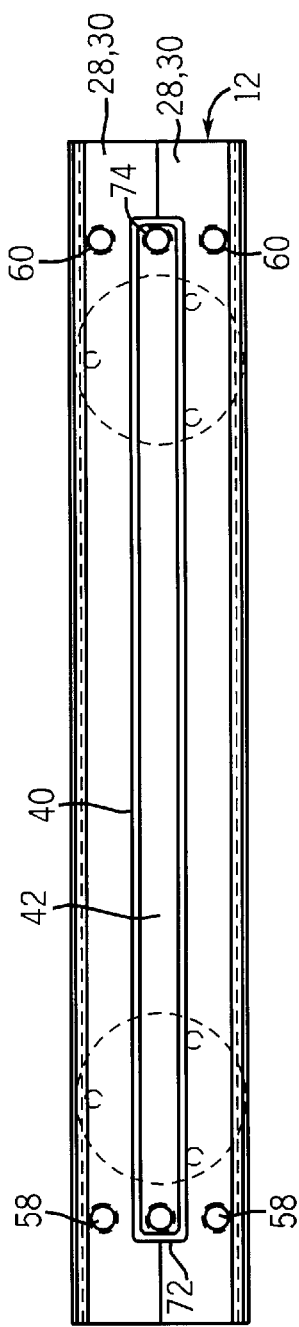
FIG. 5 is an end view of the active electrode assembly of FIG. 3.
Figure 4:
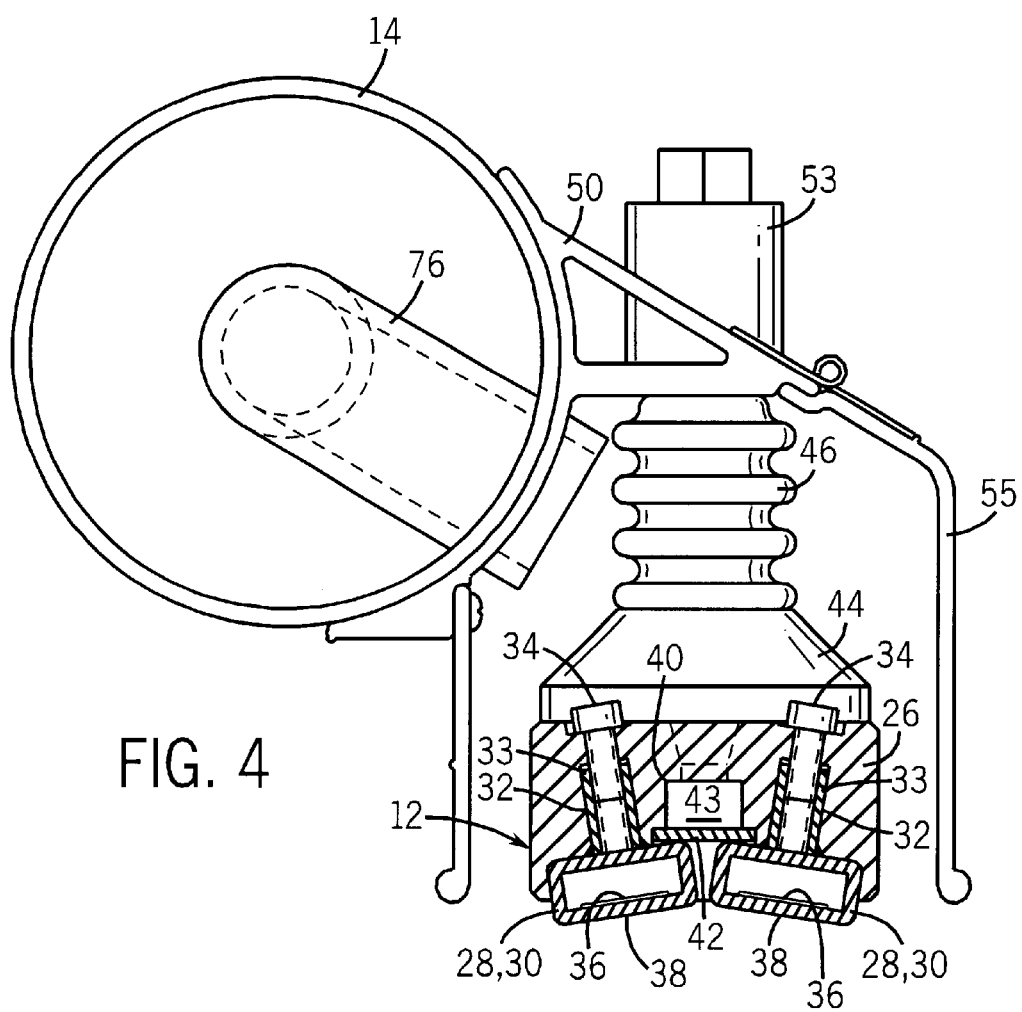
FIG. 4 is an end cross-sectional view taken along line 4—4 of FIG. 3, showing the connection of an active electrode assembly.
Figure 6:
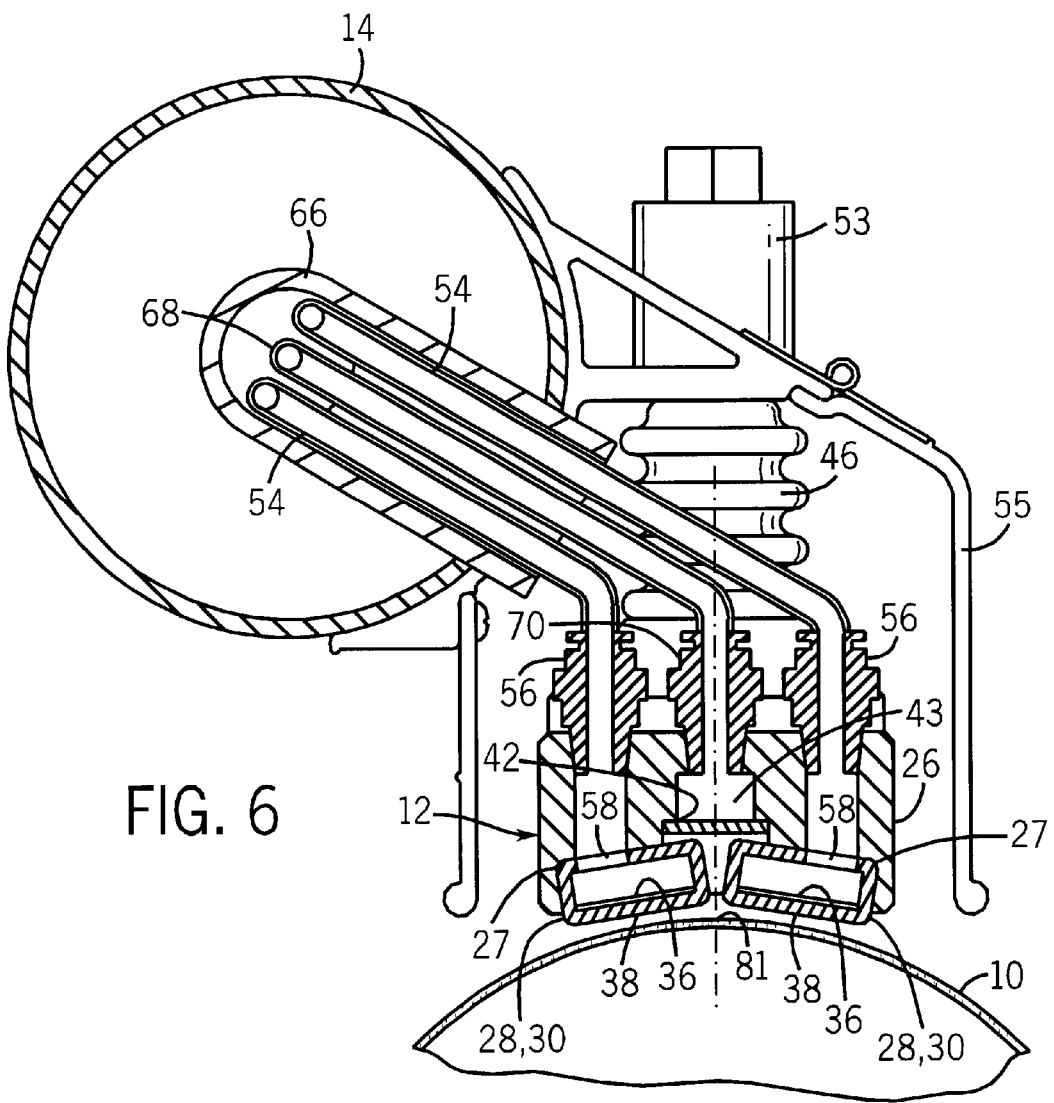
FIG. 6 is an end cross-sectional view taken along line 6—6 of FIG. 3, showing air and gas supply lines.

Referring to FIGS. 3, 4 and 5, each active electrode assembly 12 includes an electrode mounting block 26, preferably made of heat resistant, non-corrosive and non-conducting material, such as suitable phenolic. Two active electrodes 28 are mounted in recesses 27 running the length of the mounting block 26 so as to be spaced apart slightly and canted inwardly. Each active electrode 28 includes an elongated, preferably ceramic, electrode tube 30 having a generally rectangular cross-section. The electrode tube 30 extends across substantially the entire width of the treater. Each electrode tube 30 has non-conductive mounting tabs 33 spaced apart about every 18 to 24 inches that are disposed in corresponding openings 32. The mounting tabs 32 have internally threaded bores for screws 34 that retain the active electrodes 28 to the mounting block 26. Each end of the electrode tubes 30 is closed by a non-conductive end cap (not shown).

Each active electrode 28 also includes a metallic electrode strip 36, preferably made of a highly electrically conductive material, such as copper, lying along the bottom of the electrode tube 30. Referring now to FIG. 2, the roller electrode 10 is electrically coupled to ground and the electrode strip 36 is connected to the a terminal of the high voltage power supply 37, such as disclosed in U.S. Pat. No. 4,423,461

Each active electrode 28 has an active discharge surface 38 that faces the roller electrode 10. The active electrodes 28 are canted to follow the circular surface of the roller electrode 10 and to position the full width of the discharge surfaces 38 nearest to the surface of the roller electrode 10. The mounting block 26 is also formed to include a lengthwise channel 40 between the active electrodes 28 that is covered at the bottom by a lengthwise diffuser 42 so as to form a central chamber 43. The diffuser 42 forms the porous wall of the central chamber 43 and is preferably made of a heat resistant, porous material. In the preferred embodiment the porous material has a porosity of 2–20 microns, such as a porous ceramic filter element AF6 having 6 micron pores commercially available from Refractron Technologies Corp. of Newark, N.Y.

Referring to FIGS. 3 and 4, each header 14 supports an active electrode assembly 12 at bosses 44 fastened to the top of the mounting block 26. In particular, the mounting block 26 is fastened to two or more annular rib ceramic spacers 46 by screws 48. The ceramic spacers 46 are in turn fastened to a lengthwise flange 50 attached to the header 14 by fasteners held in place by air gap adjustment nuts 52 at stainless steel blocks 53. This arrangement allows the height (and thereby the gap between the active electrode assemblies 12 and the roller electrode 10) to be adjusted by turning in and out the air gap adjustment nuts 52 as needed. The active electrode assemblies 12 are shrouded by an aluminum guard 55.

Referring now to FIGS. 2, 3, 5 and 6, two air tubes 54 run from fittings 56 disposed in bores in the mounting block 26 at inlet openings 58 at one end of the active electrodes 28. The air tubes 54 can be any suitable solid or flexible conduit for carrying air, such as polyethylene tubing. At the opposite end of the active electrodes 28, outlet openings 60 have fittings 62 disposed in corresponding bores in the mounting block 26 coupling exhaust tubes 64 extending from the active electrode assembly 12 into a Pyrex elbow 66 fit in an opening in the header 14. The exhaust lines 64 extend out of one or more openings at the end of the header 14.

A gas supply line 68 runs from a fitting 70 in an inlet opening 72 at one end of the mounting block 26 leading to the chamber 43. The gas supply line 68 is preferably stainless steel tubing and/or flexible Teflon tubing. Although not shown, for wider applications (for example over 60 inches), a second gas supply line (not shown) can run to a second inlet opening 74 at the opposite end of the mounting block 26 to provide more uniform distribution along the length of the active electrodes 28. If a second gas supply line is not used, the inlet opening 74 can be closed by a suitable non-conductive plug (not shown).

The two air tubes 54 and the gas supply line 68 extend from the active electrode assembly 12 into a second elbow 76 in an opening near the opposite end of the header 14 where the air tubes 54 and gas supply line 68 exit the header 14. As shown in FIG. 2, the air tubes 54 are suitably coupled to a compressed air source 78 such as a dedicated compressor or tap from a facility compressed air system. The gas supply line 68 runs to a flow meter 80 having a mixing valve coupled to one or more pressurized gas supply tanks 82, one of which contains helium. The additional tank(s) 82 can hold nitrogen, oxygen, argon, carbon dioxide and acetylene (or other suitable gas known in the art) selected according to the material to be treated.

The air source 78 pumps approximately 2 CFM of compressed air through the air tubes 54 to the interior cavity of the active electrode tubes 30. The compressed air passes from the inlet opening 58 at one end though the length of the active electrode 28 and exits the outlet opening 60. The compressed air is relatively cool compared to the high temperatures of the active electrodes 28, which can operate at 100 degrees Celsius. The relatively cool air will carry away heat from the active electrodes 28 to cool the assembly 12. The cooling air passes by the entire surface area of the interior walls of the active electrodes 28, thereby maximizing heat transfer. Moreover, the compressed air does not draw in contaminants from the work area, which could otherwise be carbonized on the active electrodes 28 and cause arcing during use. Nor does the air evacuate the ionized air or gas in the treatment zone 81 between the active electrodes 28 and the roller electrode 10, which would adversely affect the quality of the treatment.

As mentioned above, the treater can be operated in three treatment modes: corona, chemical corona and plasma. In either case, the web material 18 is fed, at a certain line speed, through the treatment zone 81 near the discharge surfaces 38 of the active electrodes 28.

In the corona treatment mode, the gas supply is stopped at the flow meter 80 so that no gas is present at the treatment zone. Compressed air can be passed through the gas supply line 68, by opening the valve 86 (shown in FIG. 2), to force air past the outside the active electrodes 28 through the gap between the active electrodes 28 beneath the diffuser 42. Doing so provides further cooling of the active electrodes 28, which is particularly beneficial to reduce the elevated temperatures in this treatment mode caused by the higher energy requirements of ionizing air. No contaminants are introduced because air is forced out away from the active electrodes 28 and because of the low volume and velocity of the compressed air employed.

As mentioned above, the energy requirements for the active electrodes 28 depend upon factors such as the type and width of the material being treated as well as the line speed of the process. Generally, the active electrodes 28 operate at 15–30 kHz and 10 kV when corona treating a 60 inch polymer web. Corona treatment provides a suitable macroscopic smoothing of the material surface and increase in surface tension for standard labeling, inking and lamination applications.

The treatment level and be improved somewhat by operating the treater in the chemical corona mode in which gas is infused into the treatment zone and then ionized by the active electrodes 28. This is done by operating the flow meter 80 to send gas from a supply tank 84 through the gas supply line 68 into the chamber 43. In this mode, valve 86 is closed so that air is not passed through the gas line 68. The gas in the chamber 43 is uniformly distributed along the length of the active electrodes 28 by the diffuser 42. The gas is selected according to the material being treated as known in the art; for example, nitrogen is commonly used for treatment of polypropylene webs. A suitable mixture of gases may also be infused into the treatment zone. The active electrodes 28 in this mode operate under approximately the same input parameters as in the no gas corona mode mentioned above.

The infusion of nitrogen may also work to reduce the production of ozone during the ionization process, thereby potentially reducing the air removal volume requirements of the exhaust systems. The infusion of gaseous nitrogen into the corona may reduce the amount of power needed to produce a given treatment level since it is easier to ionize than air.

In the plasma mode, the flow meter 80 is adjusted to pass helium to the treatment zone so that when ionized, plasma is formed in the treatment zone 81. It has been found that the helium content of the ionized gas at the treatment zone can be as low as 80 percent helium for plasma to form. As is well known in the art, atmospheric plasma treatment, often referred to as "glow discharge plasma" provides an enhance treatment at lower energy requirements, without the formation of potentially damaging "streamers" that can occur in corona treatments. Materials with surfaces treated with plasma can be nearly homogenous. Consequently, although suitable for use for conventional polymer, foil and paper applications, plasma treating is preferred for applications requiring more uniform and enhanced treatment, such as photographic processing.

When the treater is in the plasma mode, the active electrodes 28 operate at approximately 50–100 kHz and 2–6 kV, again depending on the properties of the material being treated. To provide these characteristics, the power supply includes a second transformer, among other things, having a higher turns ratio, approximately 2 to 1 over that used for corona and chemical corona treating. The treatment level is determined in part by the amount of electrical power applied. Generally, applying more electrical power will increase the treatment level. However, atmospheric plasma treating will provide approximately the same treatment level as corona treating, with enhanced uniformity and at a lower energy. Moreover, the treatment zone 81 (the gap between the active electrodes 28 and the roller electrode 10) can be increased from approximately 0.06 inches for corona treating to about 0.375 inches, thereby significantly expanding the range of material thickness that can be treated.

Thus, the invention provides a treater that can be operated in any one of three treatment modes by simply controlling the flow of gas to the active electrodes. The treater mode can be selected according to the application. For example, the treater can be run in corona mode for low precision applications such as laminating polyolefin material or in chemical corona mode for enhanced treatment of polypropylenes. The treater can be operated in plasma mode for treating Teflon® or in high precision applications such as photographic processing or other applications where optical distortion is particularly undesirable. The conversion can be quickly and easily accomplished by operating the flow meter to change the type of gas flowing to the treatment zone or to stop gas flow altogether and selecting the proper power parameters from the power supply 37.

Moreover, the treater of the present invention can be sufficiently cooled without introducing contaminants into the electrode assembly. This is accomplished by using hollow active electrodes and circulating compressed air therethrough to transfer thermal energy from the active electrodes to the passing air. In corona mode, compressed air can be pumped through the gas line past the exterior surfaces of the active electrodes for further cooling.

It can be appreciated that many variations are possible from the preferred embodiment described above without departing from the spirit of the invention. For example, it is possible that the active electrodes could be cooled by pumping a liquid coolant, such as water, from a pressurized source through conduit running through the tubular body of the active electrodes. Reference should therefore be made to the claims for interpreting the entire scope of the invention.

We claim:

1. A treater, comprising:
   a roller electrode positioned to receive a web material that passes over its outer surface;
   an active electrode having a discharge surface positioned adjacent the roller electrode and having a tubular body with an inlet port and an outlet port in communication with an inner cavity;
   a power supply having one terminal connected to the roller electrode and another terminal connected to the active electrode to ionize a treatment zone between the roller electrode and the discharge surface; and a cooling system coupled to the inlet port of the active electrode for passing relatively low temperature air into the electrode.

2. The treater of claim 1, wherein the cooling system includes:

a compressed air source; and a conduit extending from the inlet port of the active electrode and being connectable to the air source.

3. The treater of claim 2, wherein the inlet and outlet ports are at opposite ends of the active electrode and wherein the cooling system further includes exhaust conduit connected to the outlet port.

4. The treater of claim 1, further including a second active electrode coupled to the power supply and having a discharge surface facing the roller electrode, the second active electrode being aligned side by side with the first active electrode to define a lengthwise chamber therebetween.

5. The treater of claim 4, further including a supply line opening into the lengthwise chamber and connectable to a gas supply tank for forcing a gas through the chamber to the discharge surface.

6. The treater of claim 5, wherein the gas is selected from the group consisting of: helium, oxygen, nitrogen, argon, acetylene, carbon dioxide, and combinations thereof.

7. The treater of claim 6, further including a diffuser extending between the first and second active electrodes and defining a bottom wall of the chamber.

8. The treater of claim 7, wherein the diffuser is a porous ceramic strip.

9. The treater of claim 6, wherein the gas includes helium forming a plasma in the treatment zone when the active electrode is energized.

10. The treater of claim 9, further including a diffuser extending between the first and second active electrodes and defining a bottom wall of the chamber.

11. The treater of claim 10, wherein the diffuser is a porous ceramic strip.

12. A mutli-mode treater, comprising:

a roller electrode positioned to receive a web material that passes over its outer surface;

an active electrode extending along the direction of the roller electrode and having a discharge surface spaced from the roller electrode to define a treatment zone therebetween;

a power supply having one terminal connected to the roller electrode and another terminal connected to the active electrode to ionize gas in the treatment zone; and a supply line connectable to a gas supply for directing gas to the treatment zone, wherein gas flow through the supply line can be controlled so that the treatment zone can be infused with a gas or gas mixture from the gas supply so that the treater can be selectively operated in a corona or a plasma treatment mode.

13. The treater of claim 12, wherein the gas flow to the treatment zone is at least 80% helium.

14. The treater of claim 12, wherein the gas is selected from the group consisting of: helium, oxygen, nitrogen, argon, acetylene, carbon dioxide, and combinations thereof.

15. The treater of claim 12, further including a second active electrode aligned along side the first active electrode to define a lengthwise chamber therebetween and having a discharge surface spaced from the roller electrode thereby enlarging the treatment zone.

16. The treater of claim 15, further including a diffuser extending between the first and second active electrodes and defining a bottom wall of the chamber.

17. The treater of claim 16, wherein the diffuser is a porous ceramic strip.

18. The treater of claim 16, wherein the first and second active electrodes have a tubular body supporting a metallic strip positioned adjacent the discharge surface, and wherein the electrodes each have an inlet port and an outlet port in communication with an inner cavity of the tubular body.

19. The treater of claim 18, further including a cooling system having a coolant source and conduit extending between the coolant source and the inlet port of the active electrodes.

20. The treater of claim 19, wherein the coolant is compressed air and the inlet and outlet ports are at opposite ends of the active electrode, wherein the cooling system further includes exhaust conduit connected to the outlet port.

* * * * *